(12) United States Patent
Walther et al.

(10) Patent No.: US 8,827,284 B2
(45) Date of Patent: Sep. 9, 2014

(54) KNEE WALKER

(75) Inventors: Linda M. Walther, Bristol, WI (US);
Ethan S. Abernathey, Chicago, IL (US);
Ishwor P. Adhikari, Mundelein, IL
(US); Vincent R. Lackowski, Glenview,
IL (US)

(73) Assignee: Medline Industries, Inc., Mundelein, IL
(US)

( * ) Notice: Subject to any disclaimer, the term of this
patent is extended or adjusted under 35
U.S.C. 154(b) by 168 days.

(21) Appl. No.: 13/535,700

(22) Filed: Jun. 28, 2012

(65) Prior Publication Data

US 2012/0280467 A1 Nov. 8, 2012

Related U.S. Application Data

(60) Continuation-in-part of application No. 13/413,095, filed on Mar. 6, 2012, now Pat. No. 8,496,257, which is a division of application No. 12/860,318, filed on Aug. 20, 2010, now Pat. No. 8,231,133.

(51) Int. Cl.
| *B62M 1/00* | (2010.01) |
| *B62K 5/08* | (2006.01) |
| *B62K 5/023* | (2013.01) |
| *B62K 5/05* | (2013.01) |
| *G06Q 30/06* | (2012.01) |

(52) U.S. Cl.
CPC . *B62K 5/023* (2013.01); *B62K 5/08* (2013.01);
*B62K 5/05* (2013.01); *G06Q 30/0641* (2013.01)
USPC .................................................. 280/87.041

(58) Field of Classification Search
USPC .............................. 280/87.2, 87.05, 79.11, 67
See application file for complete search history.

(56) References Cited

U.S. PATENT DOCUMENTS

| 1,288,588 A | 12/1918 | Whiting |
| 1,328,343 A | 1/1920 | Smith |
| 1,371,421 A | 3/1921 | Hoffman |
| 1,457,842 A | 6/1923 | Kashmere et al. |

(Continued)

FOREIGN PATENT DOCUMENTS

WO 2007/065174 6/2007

OTHER PUBLICATIONS

Medline: Mini 4 Parts List; Issue No. 1 dated Jan. 2005; 15 pages (30-44).

(Continued)

*Primary Examiner* — John Walters
*Assistant Examiner* — James Triggs
(74) *Attorney, Agent, or Firm* — Nixon Peabody LLP

(57) ABSTRACT

Knee walker assemblies and methods of manufacturing a knee walker assembly are provided herein. A knee walker assembly is disclosed that includes a frame with a handle mounted to the frame. At least one rear wheel is mounted to the frame proximate the rear end thereof. At least one front wheel is mounted to the frame proximate the front end thereof. The knee walker assembly also includes a support platform configured to support a portion of an appendage. A collapsible stanchion arrangement movably mounts the support platform to the frame. The collapsible stanchion arrangement includes a trolley and a first stanchion attached at a first end thereof to the support platform and attached at a second end thereof to the trolley. The trolley is slidably mounted to the frame such that movement of the trolley relative to the frame operates to adjust the vertical height of the support platform.

20 Claims, 6 Drawing Sheets

(56) References Cited

U.S. PATENT DOCUMENTS

| | | |
|---|---|---|
| 1,611,307 A | 12/1926 | Forse |
| 1,668,623 A | 5/1928 | Avril |
| 2,222,678 A | 11/1940 | Mittleburg et al. |
| 2,530,544 A | 11/1950 | Schwantes |
| 2,652,097 A | 9/1953 | Warren |
| 3,419,283 A | 12/1968 | Newland |
| 3,572,757 A | 3/1971 | Camps |
| 3,623,749 A | 11/1971 | Jensen |
| 3,890,668 A | 6/1975 | Stosberg et al. |
| 3,990,717 A | 11/1976 | Best |
| 3,992,024 A | 11/1976 | Workman |
| 4,029,329 A | 6/1977 | Chambers |
| 4,065,145 A | 12/1977 | Chambers |
| 4,202,561 A | 5/1980 | Yonkers |
| 4,239,248 A | 12/1980 | Ewers |
| 4,342,466 A | 8/1982 | Morgan |
| 4,621,804 A | 11/1986 | Mueller |
| 4,750,578 A | 6/1988 | Brandenfels |
| 4,830,133 A | 5/1989 | Gaddi |
| 4,844,494 A | 7/1989 | Blanchard |
| 4,867,188 A | 9/1989 | Reid |
| 4,907,794 A | 3/1990 | Rose |
| 4,917,396 A | 4/1990 | Meneses et al. |
| 4,930,796 A | 6/1990 | Harrod |
| 4,944,360 A | 7/1990 | Sturges |
| 5,158,313 A | 10/1992 | Becker |
| 5,167,597 A | 12/1992 | David |
| 5,388,659 A | 2/1995 | Pepe |
| 5,551,717 A | 9/1996 | De Courcey Milne |
| 5,600,857 A | 2/1997 | Heilmann |
| 5,702,326 A | 12/1997 | Renteria |
| 5,800,317 A | 9/1998 | Accetta |
| 5,816,593 A | 10/1998 | Che |
| 5,839,740 A | 11/1998 | Seeger |
| 6,053,189 A | 4/2000 | Longenecker et al. |
| 6,099,002 A | 8/2000 | Uchiyama |
| 6,149,170 A | 11/2000 | Dotson |
| 6,161,860 A | 12/2000 | Corneau |
| 6,311,708 B1 | 11/2001 | Howle |
| 6,343,802 B1 * | 2/2002 | Workman et al. ........ 280/87.041 |
| 6,481,730 B2 | 11/2002 | Sung |
| 6,520,525 B1 | 2/2003 | Yoon |
| 6,634,660 B2 | 10/2003 | Miller |
| 6,848,696 B2 | 2/2005 | Miller |
| 7,001,313 B1 | 2/2006 | Crnkovich |
| 7,311,319 B1 * | 12/2007 | Ortega ........................ 280/87.05 |
| 7,341,310 B1 * | 3/2008 | Ross ......................... 297/344.17 |
| 7,780,180 B2 | 8/2010 | Hoepner et al. |
| 2001/0038186 A1 | 11/2001 | Wychozowycz |
| 2002/0130482 A1 | 9/2002 | Jang |
| 2004/0201192 A1 | 10/2004 | Ramm |
| 2005/0121873 A1 | 6/2005 | Miller |
| 2006/0033297 A1 | 2/2006 | Miller |
| 2007/0182116 A1 | 8/2007 | Davey et al. |
| 2009/0058037 A1 | 3/2009 | Accetta |

OTHER PUBLICATIONS

International Search Report mailed Mar. 26, 2012 which issued in corresponding International Patent Application No. PCT/US2011/047880 (5 pages).

Written Opinion mailed Mar. 26, 2012 which issued in corresponding International Patent Application No. PCT/US2011/047880 (6 pages).

* cited by examiner

KNEE WALKER

CROSS-REFERENCE AND CLAIM OF PRIORITY

This application is a continuation-in-part of U.S. patent application Ser. No. 13/413,095, filed on Mar. 6, 2012, which is a divisional of U.S. patent application Ser. No. 12/860,318, filed on Aug. 20, 2010, both of which are incorporated herein by reference in their respective entireties.

TECHNICAL FIELD

The present disclosure relates generally to ambulatory assistance devices for the physically impaired, and more particularly to multi-wheeled knee walker assemblies for aiding the disabled in walking.

BACKGROUND

Congenital, degenerative, and accidental damage to the human body can be debilitating, sometimes causing a person to lose their ability to walk without assistance. Various self-propelled carts, scooters, walkers, etc. have been designed to assist in the locomotion of a disabled person. The most well known example of these devices is the wheelchair, which typically comprises a seat that is connected to four support wheels by a rigid frame. Wheelchairs come in motorized and manually-powered variations, where the wheelchair is propelled by motors in the former instance or by the seated occupant turning the driving wheels by hand in the latter instance.

Another device for assisting in the locomotion of a disabled person is the knee walker. The knee walker is typically intended for users with an injury below the knee, such as an Achilles tendon injury, a fracture of the foot or ankle, or gout. The knee walker is designed to elevate and support a non-ambulatory leg, while allowing the user to utilize the ambulatory leg for propulsion. Most knee walkers include an elevated knee bench that is rigidly mounted on a support frame, both the support frame and the platform being maneuverable on casters or wheels. There are three general types of knee walkers: (1) knee walker assemblies that have rigidly mounted wheels and no steering capabilities, (2) knee walker assemblies that have rigidly mounted wheels and can be steered, and (3) knee walker assemblies with swivel-mounted wheels and no steering capabilities.

One known knee walker assembly includes a four-wheeled walking cart that is designed for supporting a person's leg and foot. The cart includes a frame, a leg support member coupled to the frame, and a handlebar coupled to the frame. The cart has two swivel-mounted front wheels and two rigidly-mounted rear wheels. The two rigidly-mounted rear wheels can be laterally shifted between first and second asymmetrical wheel positions relative to the frame, thereby accommodating a person having a non-ambulatory lower left leg or a non-ambulatory lower right leg, respectively.

Another known knee walker assembly includes a four-wheeled walking cart that is designed for supporting a person's leg and foot. The cart includes a frame, a leg support member coupled to the frame, and a handlebar movably coupled to the frame. The cart has two swivel-mounted front wheels and two rigidly-mounted rear wheels. The handlebar is moveable between first and second asymmetrical handlebar positions relative to the frame, thereby accommodating a person having a non-ambulatory lower left leg or a non-ambulatory lower right leg, respectively.

In yet another known configuration, a therapeutic scooter is provided. The scooter includes a tubular frame with four rigidly mounted wheels. The wheel assembly includes front and rear axles, each axle maintaining a pair of laterally offset wheels. A steering assembly is telescopingly coupled to the front axle. The steering assembly has a cross-bar with handles. The cross-bar is provided with a braking mechanism to slow and stop the scooter.

According to another known design, a steerable kneeling walker is presented that includes a frame, a steering assembly coupled to the frame, and a steering stem. The kneeling walker is movably supported on four rigidly mounted wheels. The control assembly is coupled to the steering stem to rotate the front wheels about separate pivot points.

There are various disadvantages and drawbacks to the currently available knee walker assemblies. For instance, knee walker designs where the wheels are 100% rigid will have limited maneuverability. If the knee walker does not have built-in steering capabilities, the entire knee walker assembly must be lifted and repositioned to turn. If the knee walker does have built-in steering capabilities, the turning radius may be too large for tight places such as airport shops, bathrooms, etc. In contrast, knee walker configurations where the wheels swivel 100% may be dangerous due to limited control of the assembly when the ambulatory leg is not in contact with the ground. The features of the present disclosure eliminate the drawbacks present in these designs.

BRIEF DESCRIPTION OF THE DRAWINGS

Various benefits and advantages of the present disclosure will become apparent upon reading the following detailed description and upon reference to the drawings.

Figure 1:
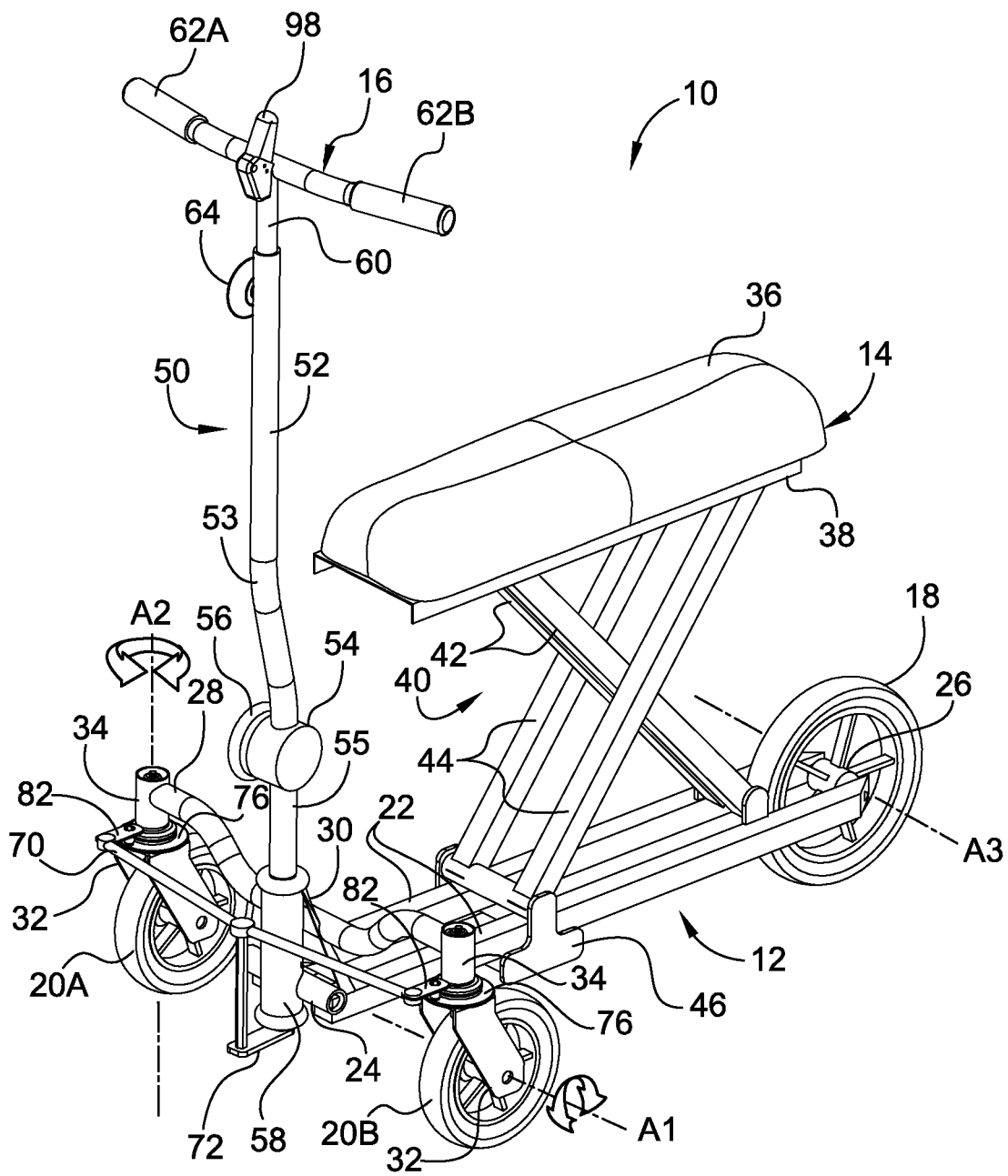
FIG. 1 is an isometric illustration of an exemplary knee walker assembly in accordance with aspects of the present disclosure.

While the invention is susceptible to various modifications and alternative forms, specific embodiments are shown by way of example in the drawings and will be described in detail herein. It should be understood, however, that the invention is not limited to the particular forms disclosed. Rather, the invention is to cover all modifications, equivalents, and alternatives falling within the spirit and scope of the invention.

DETAILED DESCRIPTION OF THE ILLUSTRATED EMBODIMENTS

While this invention is susceptible of embodiment in many different forms, there are shown in the drawings and will herein be described in detail representative embodiments of the invention with the understanding that the present disclosure is to be considered as an exemplification of the principles of the invention and is not intended to limit the broad aspects of the invention to the embodiments illustrated. To that extent, elements and limitations that are disclosed, for example, in the Figures, Abstract, and Detailed Description of the Illustrated Embodiments, but not explicitly set forth in the claims, should not be incorporated into the claims, singly or collectively, by implication, inference or otherwise. For purposes of the present detailed description, unless specifically disclaimed, the singular includes the plural and vice versa; the words "and" and "or" shall be both conjunctive and disjunctive; the word "all" means "any and all"; the word "any" means "any and all"; and the word "including" means "including without limitation." Moreover, words of approximation, such as "about," "almost," "substantially," "approximately," and the like, can be used herein in the sense of "at, near, or nearly at," or "within 3-5% of," or "within acceptable manufacturing tolerances," or any logical combination thereof, for example.

Referring to the drawings, wherein like reference numbers refer to like components throughout the several views, FIG. 1 presents an isometric illustration of an exemplary knee walker assembly, designated generally as 10, in accordance with various aspects of the present disclosure. The drawings presented herein are not to scale, and are provided purely for explanatory purposes. Thus, the individual and relative dimensions and orientations shown in the drawings are not to be considered limiting. In addition, the use of spatial adjectives in the specification and claims, such as "front," "rear," "forward," "rearward," "upward," "downward," etc., are intended, unless explicitly indicated otherwise, to specify the comparative orientation of a given component relative to the knee walker assembly when operatively mounted thereto.

The knee walker assembly 10 is intended for, albeit not per se limited to, aiding a physically impaired person in walking. In the illustrated embodiment, the knee walker assembly 10 includes a rigid frame, designated generally at 12, a support platform 14 that is mounted to the frame 12, a handle or handle bar 16, at least one rear wheel 18 mounted to the frame 12 proximate the rear end thereof, and at least two front wheels (e.g., right and left front wheels 20A and 20B, respectively) mounted to the frame 12 proximate the front end thereof. The frame 12 is desirably fabricated from a rigid material, which may include, but is not limited to, metals, such as aluminum and steel, polymers, such as polyvinyl chloride (PVC) and polyethylene terephthalate (PET), glass-fiber composites, etc. The frame 12 is shown in the drawings comprising a tubular structure with two generally horizontal, longitudinally oriented base beams 22 connected at the front with a laterally oriented cross-beam 24 and at the back with a laterally oriented wheel bearing 26. A front axle 28 extends transversely across the front of the frame 12, rigidly mounted to each of the base beams 22 via a respective upwardly extending coupling bracket 30 (only one of which is visible in the drawings, but a second coupling bracket is also present in the illustrated frame 12). Optional end plugs can be inserted into the open ends of the base beams 22, cross-beam 24, and/or other open tube ends for aesthetic and/or safety purposes.

Recognizably, the frame 12 may comprise fewer or greater than the various beams illustrated in FIG. 1. Moreover, the length, width, and height of frame 12 can be modified, for example, to accommodate the particular user and/or intended application of the knee walker assembly 10. It is likewise contemplated that one or more of the beams can be replaced with alternate structure, such as a base plate or box. To that end, the base beams 22 and cross-beam 24 are exemplified in the drawings as elongated, hollow tubes; alternatively, the beams 22, 24 may be fabricated as solid bars, and may take on alternative geometries.

With continuing reference to the exemplary embodiment of FIG. 1, each of the front wheels 20A, 20B is swivel mounted (i.e., attached in a swivel-type mounting configuration) to the front axle 28. As used herein, "swivel mount" and "swivel-type mounting configuration" is intended to indicate a mounting arrangement where the wheel can revolve around a rolling axis and rotate about a non-rolling axis. For example, each of the front wheels 20A, 20B is connected (e.g., via a wheel-pin or roller bearing) to a respective swivel fork 32 such that the wheel 20A, 20B can revolve around its central rolling axis A1. The swivel fork 32, in turn, is connected via a swivel joint 34 to the front axle 28. The swivel joint 34 allows the swivel fork 32 to rotate about a non-rolling axis A2 that is laterally offset from the center of the front axle 28 and passes through a diametric plane of the wheel 20A, 20B. In other words, the front wheels 20A, 20B, when in a swivel-type mounting configuration, can roll around axis A1 and swivel about axis A2, which is generally perpendicular to axis A1. When in motion along a straight line, the swivel mounted wheels 20A, 20B will tend to automatically align with, and rotate parallel to the direction of travel.

In contrast to the front wheels 20A, 20B, the rear wheel 18 is shown attached in a rigid-type mounting configuration to the rear of the frame 12. As used herein, "rigid mount" and "rigid-type mounting configuration," when referring to a wheel, is intended to indicate a mounting arrangement where the wheel can rotate relative to the wheel mount, but the wheel mount is restricted from freely rotating relative to the frame. For example, the rear wheel 18 is rotatably mounted, e.g., via wheel bearing 26, to the longitudinally oriented base beams 22 such that the wheel 18 can revolve around its central rolling axis A3. Unlike the front wheels 20A, 20B, however, the rear wheel 18 cannot swivel on the roller bearing 26 around a non-rolling axis. In some embodiments, such as that illustrated in FIG. 1, the knee walker assembly 10 has a single rear wheel 18 that is longitudinally spaced from and centrally aligned with the front wheels 20A, 20B.

The support platform 14 is configured to support at least one human appendage. In the illustrated embodiment, for example, the support platform 14 is designed to prop up and hold a user's non-ambulatory lower leg during operation of the knee walker assembly 10. In the illustrated embodiment, for example, the support platform 14 of FIG. 1 includes a cushion 36 fixed to the upper surface of a planar substrate 38. The cushion 36 may comprise, for example, a molded plastic body or a foam core that is covered with vinyl or any other suitable material.

According to one aspect of the present disclosure, the support platform 14 is vertically adjustable (i.e., may be raised or lowered) relative to the frame 12. In one exemplary configuration, the support platform 14 is mounted on a collapsible stanchion arrangement, designated generally at 40 in FIG. 1. The collapsible stanchion arrangement 40 includes a pair of pivoting stanchions 42 that are pivotably attached at respective first ends to the substrate 38 and pivotably attached at respective second ends to the base beams 22 of the frame 12. The collapsible stanchion arrangement 40 also includes a pair of sliding stanchions 44 that are pivotably attached at respective first ends to the substrate 38 and pivotably attached at respective second ends to a movable trolley 46. The trolley 46 is slidably mounted to the base beams 22 for rectilinear travel between the front and rear ends of the frame 12. The trolley 46 is configured to adjust the vertical height of the support platform 14. In particular, sliding the trolley 46 forward on the frame 12 (i.e., to the left in FIG. 1) causes the pivoting stanchions 42 and sliding stanchions 44 to collapse onto each other in a scissor-like fashion, thereby drawing the support platform 14 down towards the base beams 22. Sliding the trolley 46 in the opposite direction towards the rear end of the frame 12 (i.e., to the right in FIG. 1), in contrast, will draw the first and second ends of the pivoting stanchions 42 together with the first and second ends of the sliding stanchions 44, respectively, thereby raising the support platform 14. Alternate arrangements for raising and lowering the support platform 14 are also envisioned, such as a telescoping support-column arrangement or a pneumatic air cylinder arrangement.

Figure 2:
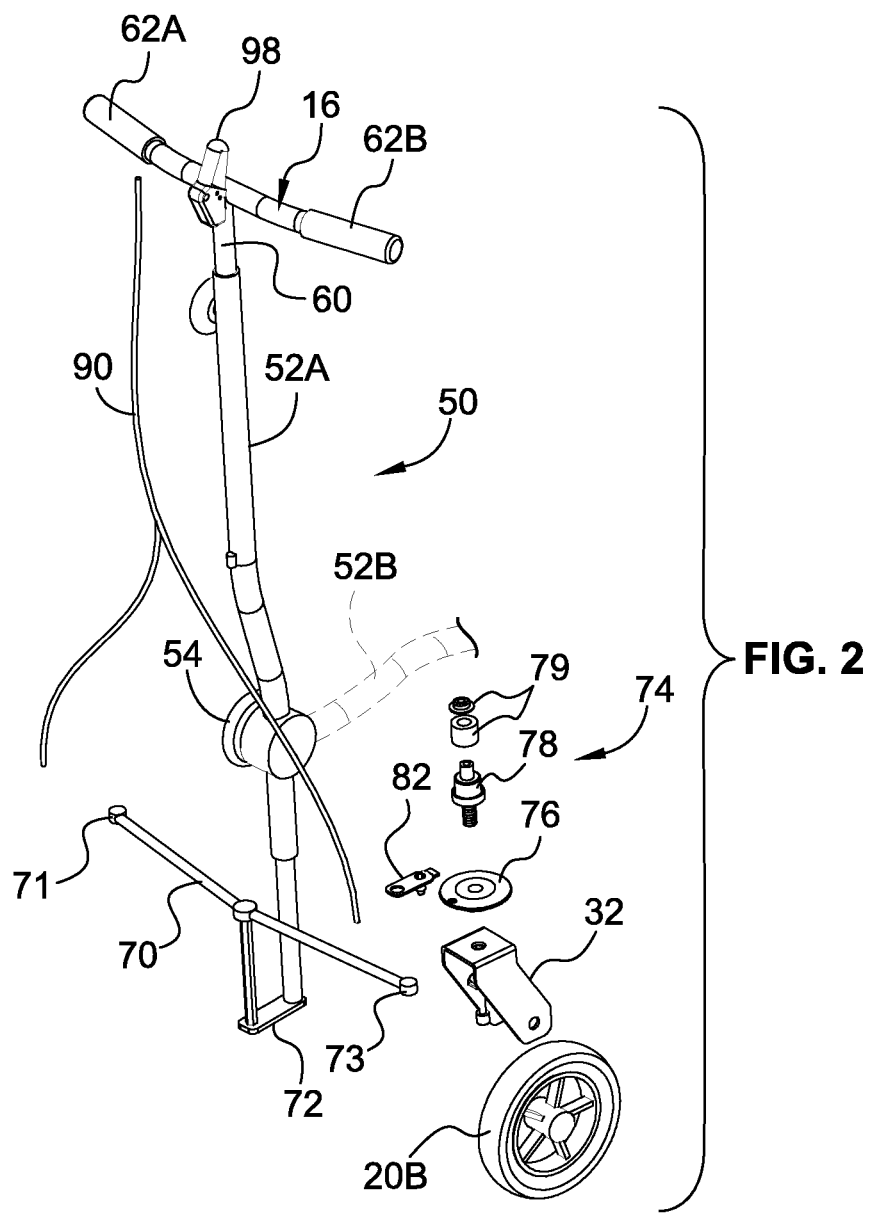
FIG. 2 is a partially exploded perspective-view illustration of a portion of the knee walker assembly of FIG. 1.

The knee walker assembly 10, in some embodiments, is also provided with a steering mechanism, designated generally as 50, that is configured to selectively reposition the front wheels 20A, 20B such that the knee walker assembly 10 can be maneuvered by the user. The steering mechanism 50 shown in FIGS. 1 and 2 comprises a steering column 52 that is attached at a first end to the frame 12 and at a second end to the handle bar 16. The steering column 52 passes through a hollow sleeve 58, which is coupled to the front axle 28 and the base beams 22 at the front end of the frame 12. As best seen in FIG. 2, a connector plate 72 attaches a T-shaped tie rod 70 to the lower end of the steering column 52 such that the tie rod 70 rotates with the steering column 52 via manipulation of the handle bar 16. Each lateral end 71, 73 (FIG. 2) of the tie rod 70 selectively engages with a respective one of the front wheels 20A, 20B, as described below. When so engaged, the tie rod 70 turns the front wheels 20A, 20B in response to the rotation of the handle bar 16 and, thus, the steering column 52.

The steering column 52, in some embodiments, may be selectively repositionable between an upright position, exemplified at 52A in FIG. 2, and a collapsed position, exemplified schematically with hidden lines at 52B in FIG. 2. For example, the steering mechanism 50 may be provided with a locking hub 54 that is configured to retain the steering column 52 in a plurality of positions relative to the frame 12, including the upright position 52A, the collapsed position 52B, and one or more positions therebetween. In this instance, the steering column 52 is separated into two segments, with an upper segment 53 of the steering column 52 fixedly attached to an outer cuff of the locking hub 54, and a lower segment 55 of the steering column 52 fixedly attached to an inner cuff of the locking hub 54. Rotation of a tension dial 56 in one direction (e.g., in a counterclockwise direction) will loosen the locking hub 54, allowing the user to reorient the upper segment 53 of the steering column 52 relative to the lower segment 55 thereof. Once oriented in the desired position, rotation of the tension dial 56 in an opposite direction (e.g., in a clockwise direction) will mechanically lock the upper and lower segments 53, 55 of the steering column 52 in the selected orientation.

In another embodiment, the handle bar 16 includes right and left handle grips 62A and 62B, respectively, attached at opposing ends of the upper transverse section of a T-shaped handle mount 60. The handle bar 16 may be adjustable, for example, to accommodate users of differing heights and/or for increased compactness during storage of the knee walker assembly 10. According to one exemplary configuration, the handle mount 60 of FIG. 1 is designed to telescope with respect to the steering column 52. For example, the downwardly extending section of the T-shaped handle mount 60 is slidably received through an opening in a hollow portion of the upper segment 53 of the steering column 52. A locking screw 64 is provided which is repositionable to allow a user to adjust the position of the handle mount 60 relative to the steering column 52. For instance, rotation of the locking screw 64 (e.g., in a counterclockwise direction) will release the handle mount 60, allowing for longitudinal translation thereof into and out of the steering column 52. Once oriented in the desired position, rotation of the locking screw 64 in an opposite direction (e.g., clockwise) will mechanically retain the handle mount 60 in the selected orientation. Any of a wide variety of alternative coupling mechanisms may readily be employed as a substitute for the locking screw 64 (e.g., a quick-connect locking device or a spring-biased locking pin). In addition, alternative handle arrangements, wheels, or other steering configurations may be used on alternate embodiments. Moreover, the knee walker assembly 10 may be provided with an optional braking mechanism (not shown) that is operable to slow and/or stop the knee walker assembly 10.

Both of the front wheels 20A, 20B of the knee walker assembly 10 are configured to selectively switch between a swivel-type mounting configuration and a rigid-type mounting configuration. The knee walker assembly 10 of FIGS. 1-3, in some embodiments, includes a variable mounting assembly, designated generally as 74 in FIG. 2, for mounting the front wheels proximate the front end of the frame 12. The variable mounting assembly 74 is designed to simultaneously or nearly simultaneously transition both of the front wheels 20A, 20B from a swivel-type mounting configuration to a rigid-type mounting configuration, and back. In some embodiments, the knee walker assembly 10 includes a locking mechanism that selectively engages the front wheels 20A, 20B to simultaneously or substantially simultaneously lock both of the front wheels 20A, 20B in a rigid-type mounting configuration. This provides the knee walker assembly 10 with all of the advantages of having swivel-mounted front wheels (e.g., increased maneuverability), while eliminating the disadvantages of a knee walker assembly with only swivel mounted front wheels (e.g., limited control).

Figure 3:
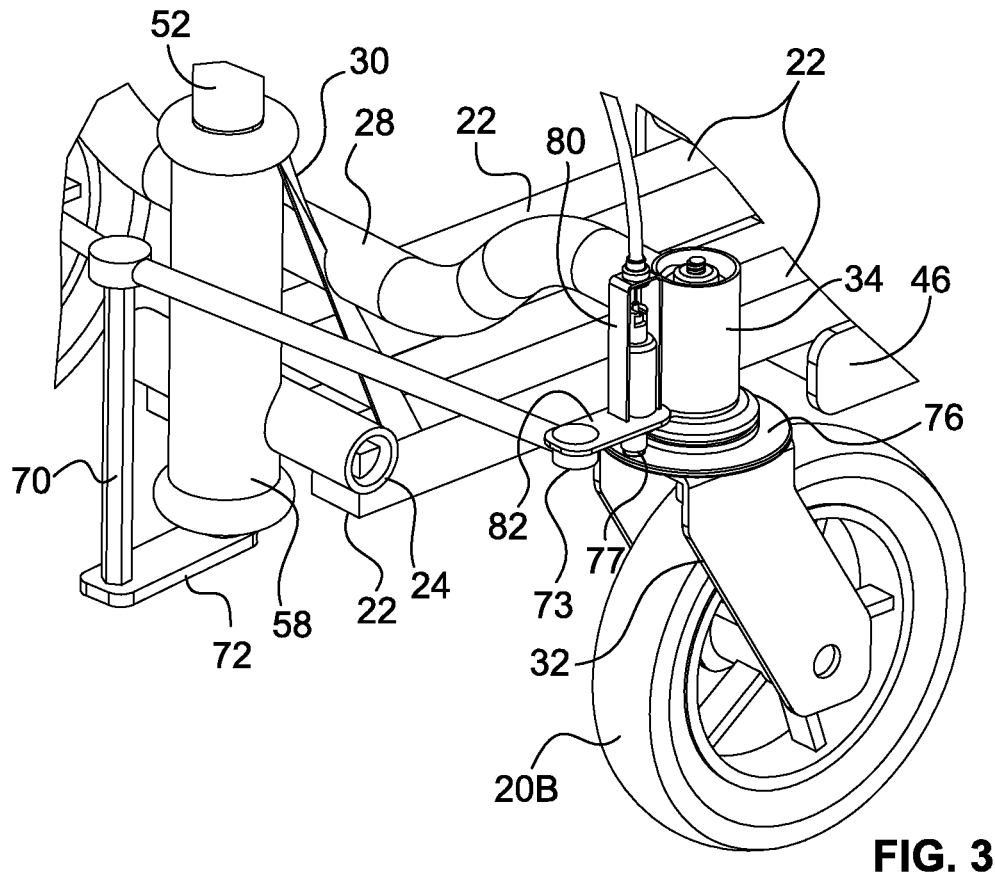
FIG. 3 is an enlarged perspective-view illustration of another portion of the knee walker assembly of FIG. 1.

As described above, the front wheels 20A, 20B are swivel mounted to the frame 12 by swivel forks 32 and swivel joint 34. A locking disc 76, which is most readily visible in FIGS. 2 and 3, is rigidly fastened to the top of each swivel fork 32, for example, via a compression bushing 78 and a bushing and nut combination 79, both of which are part of the swivel joint 34. Each locking disc 76 includes an aperture 77 (readily visible in FIG. 2, but only labeled in FIG. 3) that is shaped and sized to receive a locking pin 86 (FIG. 4) to thereby lock the respective front wheel 20A, 20B in the rigid-type mounting configuration.

Figure 4:
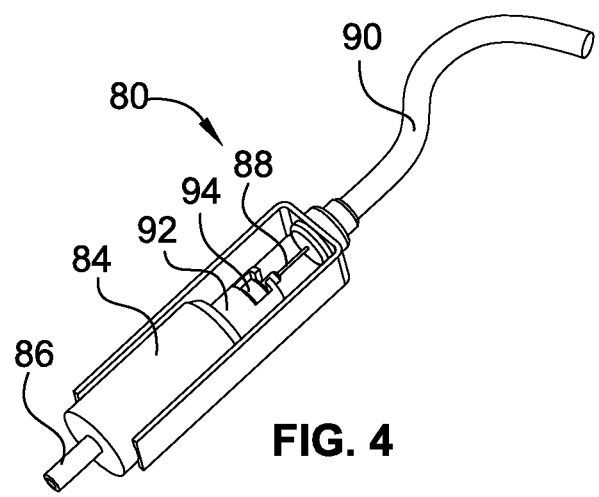
FIG. 4 is an enlarged perspective-view illustration of an exemplary locking-pin mechanism that may be used with the knee walker assemblies of FIGS. 1 and 5.

The knee walker assembly 10 also includes a pair of retractable locking pin assemblies 80, illustrated in FIGS. 3 and 4, each of which is mounted onto a steering tab 82 at a respective lateral end 71, 73 of the tie rod 70. Each locking pin assembly 80 is configured to selectively engage a respective one of the front wheels 20A, 20B—namely, the corresponding locking disc 76, to thereby lock the front wheel 20A, 20B in a rigid-type mounting configuration. In particular, as seen in FIGS. 3 and 4, each retractable locking pin assembly 80 comprises a generally hollow, cylindrical housing 84 that is attached (e.g., via fasteners or welding) to one of the steering tabs 82. A locking pin 86 is slidably mounted at least partially within the housing 84. A biasing member, such as a compression spring (not visible in the views provided) is disposed within the housing 84. The biasing member urges the locking pin 80 into an extended position whereat a distal end of the locking pin 86 extends out of the housing 84 (as seen in FIG. 4) into the aperture 77 of the locking disc 76 (as seen in FIG.

3). When the locking pin 86 is properly seated inside the aperture 77, the swivel fork 32 is restricted from freely rotating about the non-rolling axis A2. As such, each wheel 20A, 20B can rotate relative to the swivel fork 32 around its respective central rolling axis A1, but the swivel fork 32 cannot freely rotate (i.e., "swivel") relative to the front axle 28—i.e., the wheel is in a "rigid-type mounting configuration."

A retractor cable 88 is routed through a sheath 90 and attached at a proximal end 92 of the locking pin 86 via a cable connector 94. The retractor cable 88 is configured to selectively draw the locking pin 86 out of engagement with the locking disc 76, thereby releasing the front wheels 20A, 20B for rotation about the swivel joint 34. In the illustrated embodiment, for example, an activating lever 98, which is shown in FIGS. 1 and 2, is attached to the handle bar 16 (e.g., at a midsection of the handle mount 60 between the right and left handle grips 62A and 62B). The activating lever 98 is configured to selectively disengage both retractable locking pin assemblies 80 from the locking discs 76. In particular, drawing the activating lever 98 backwards (e.g., to the right in FIG. 1) will apply a tensile force to the retractor cable 88, which in turn will transmit the tensile force to the proximal end 92 of the pins 86 via the cable connectors 94. When the tensile force on the pins 86 overcomes the biasing member, the pins 86 will translate longitudinally in a generally rectilinear motion into the housing 84 and out of engagement with the locking discs 76. In so doing, the swivel joints 34 are operable such that the swivel forks 32 can rotate about the non-rolling axes A2. As such, each wheel 20A, 20B can rotate relative to the fork 32 around its respective central rolling axis A1, and each fork 32 can rotate relative to the front axle 28 around its respective non-rolling axis A2—i.e., each wheel is in a "swivel-type mounting configuration."

In some embodiments, when the front wheels 20A, 20B are in the swivel-type mounting configuration, the steering mechanism 50 is rendered inoperable, for example, because the tie rod 70 is disengaged from the wheels 20A, 20B. In an alternative configuration, the knee walker assembly can include a steering locking mechanism that is operable to lock or otherwise secure the steering mechanism 50 in place. One exemplary design includes a steering locking pin that is operatively mounted, e.g., by a U-shaped mounting bracket, to the frame 12. An actuator cable is attached at one end thereof to the activating lever 98, and at another end thereof to a proximal end of the steering locking pin. When the lever 98 is activated (e.g., drawn backwards) by the user, both retractable locking pin assemblies 80 are disengaged from the locking discs 76, as described above. In addition, a distal end of the steering locking pin is engaged with the tie rod 70—e.g., received via a complementary cavity or hole in a portion of the tie rod 70, when the lever 98 is activated. For example, the steering locking pin can be movably mounted to the U-shaped mounting bracket by a pivot plate. In this instance, the locking pin is attached at a first lateral end of the pivot plate and the actuator cable is attached at an opposing second lateral end of the pivot plate. The pivot plate is pivotably mounted to the U-shaped bracket (e.g., via a hinge or pin) to rotate about its center. The first lateral end of the pivot plate can be urged upwards by a biasing member (e.g., a compression spring) such that the steering locking pin is biased out of engagement with the tie rod 70. However, when the lever 98 is activated, a tensile force is applied to the actuator cable, which is transferred to the second lateral end of the pivot plate. This tensile force, in turn, will rotate the pivot plate about its central axis, pushing the first lateral end down against the biasing member, thereby feeding the steering locking pin into the hole in the tie rod 70. In so doing, the tie rod 70 is rigidly locked to the frame 12. The steering column 52 is thus rigidly locked to the frame 12 via the connector plate 72 that attaches the T-shaped tie rod 70 to the lower end of the steering column 52. As such, the steering mechanism 50 cannot be repositioned (or turned) by the user.

In some embodiments, when the front wheels 20A, 20B are released by the retractable locking pin assemblies 80, they are operable to pivot less than approximately 360 degrees about the non-rolling axis A2. In some embodiments, when the front wheels 20A, 20B are released by the retractable locking pin assemblies 80, they are operable to pivot less than approximately 160 degrees about the non-rolling axis A2. The pivot range of the front wheels 20A, 20B may be limited by integrating stops or other appropriate structure into the knee walker assembly 10. Alternatively, when the front wheels 20A, 20B are released by the retractable locking pin assemblies 80, they are operable to freely pivot about the non-rolling axis A2.

According to another aspect of the present disclosure, an improved method of manufacturing a knee walker assembly is presented. In some embodiments, the method includes: mounting a support platform to a rigid frame, the support platform being configured to support at least one human appendage; mounting a handle to the frame; mounting at least one rear wheel proximate a rear end of the frame; mounting at least two front wheels proximate a front end of the frame such that the front wheels can transition between a swivel-type mounting configuration and rigid-type mounting configuration; attaching a locking mechanism to the frame, the locking mechanism being configured to substantially simultaneously lock both of the at least two front wheels in the rigid-type mounting configuration.

In some embodiments, the method of manufacturing a knee walker assembly includes at least those steps identified in the preceding paragraph. It is also within the scope and spirit of the present invention to omit steps, include additional steps, and/or modify the order presented above. For example, in some embodiments, the method also includes mounting a steering mechanism to the frame, the steering mechanism being configured to selectively reposition the at least two front wheels. It should be further noted that the method represents a single sequence of manufacturing a knee walker assembly. However, it is expected that the method be practiced systematically to manufacture numerous knee walker assemblies. Although the method is described herein with respect to the structure illustrated in FIGS. 1-4, the claimed methods of the present disclosure are not limited to these exemplary embodiments.

Figure 5:
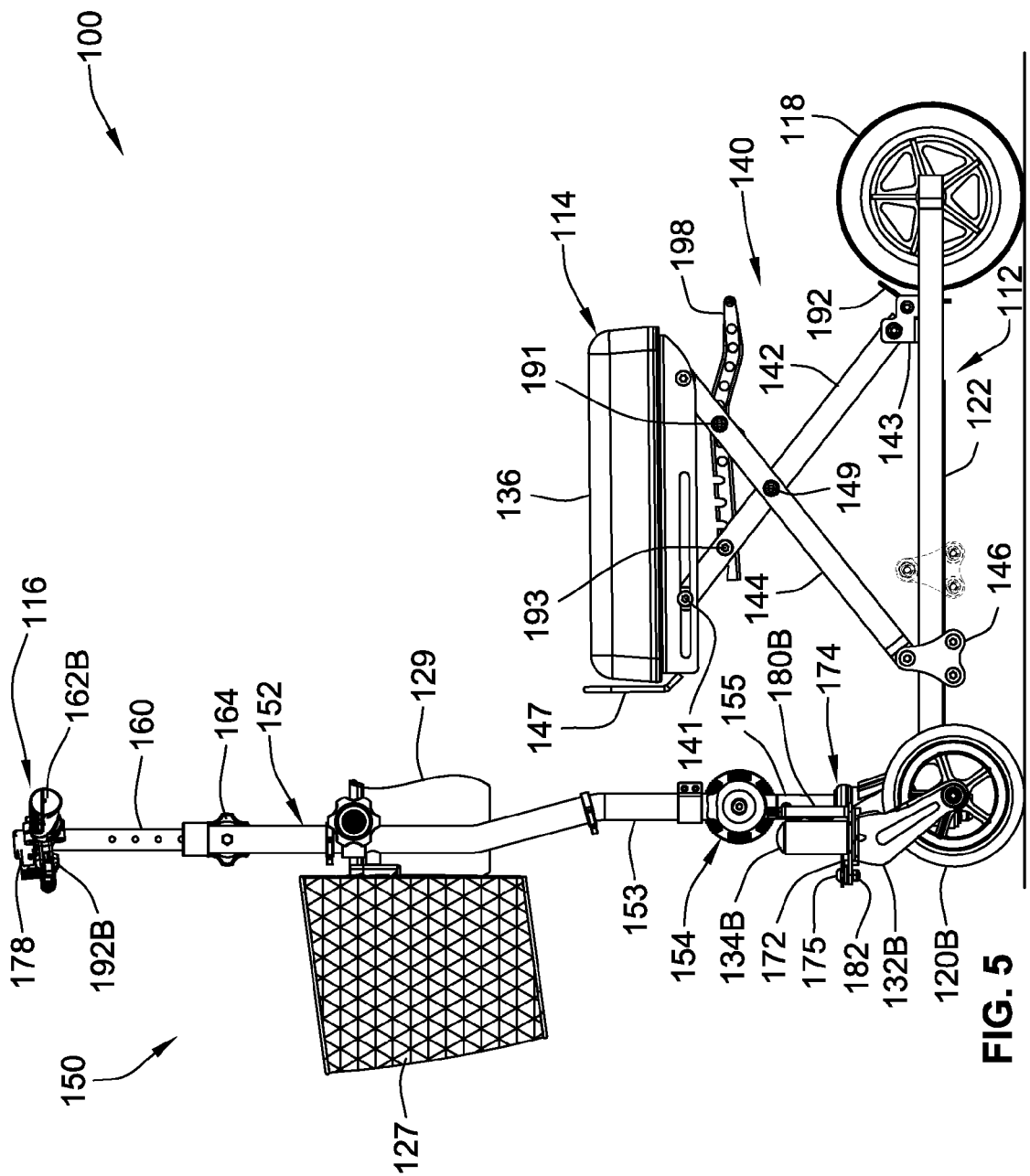
FIG. 5 is a side-view illustration of another representative knee walker assembly in accordance with aspects of the present disclosure.

FIG. 5 is side-view illustration of another representative knee walker assembly, designated generally as 100, in accordance with aspects of the present disclosure. The knee walker 100 can take on any of the various forms, optional configurations, and functional alternatives described above with respect to the knee walker 10 exemplified in FIGS. 1-4 (and vice versa), and thus can include any of the corresponding options, alternatives and features. In this regard, the knee walker assemblies disclosed herein can include numerous additional, alternative, and other well-known peripheral components without departing from the intended scope and spirit of the present disclosure. Seeing as these components are well known in the art, they will not be described in further detail.

Figure 6:
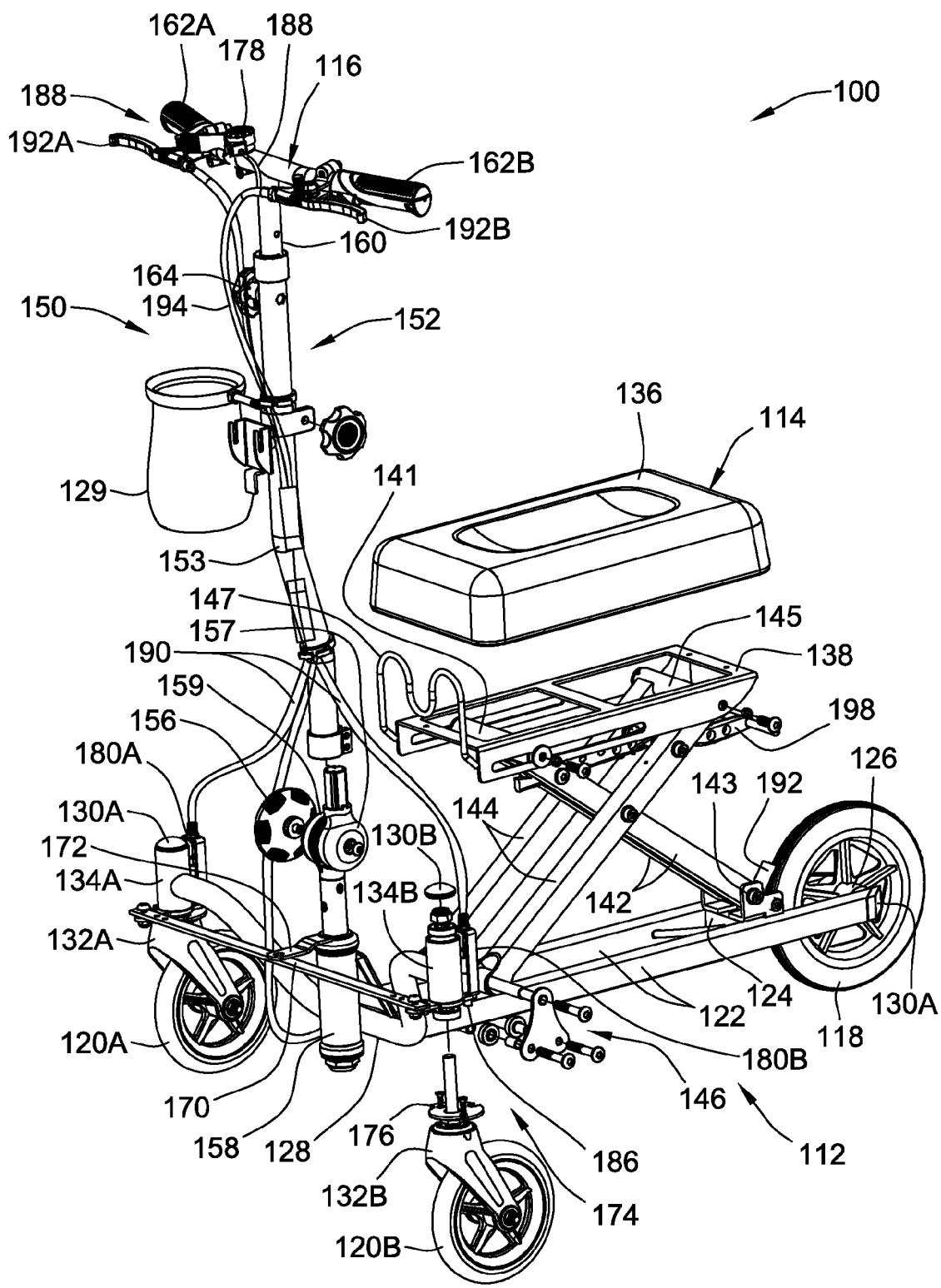
FIG. 6 is a partially exploded perspective-view illustration of the knee walker assembly of FIG. 5.

The knee walker assembly 100 illustrated in FIGS. 5 and 6 includes a rigid frame, designated generally at 112, with a support platform 114 that is movably mounted to the frame 112, and a handle or handle bar 116 that is operatively mounted to the frame 112. At least one rear wheel 118 is rotatably mounted to the frame 112 proximate the rear end thereof, and at least two front wheels (e.g., right and left front wheels 120A and 120B, respectively) are rotatably mounted to the frame 112 proximate the front end thereof. In some embodiments, the knee walker assembly 100 has only a single rear wheel 118 that is longitudinally spaced from and centrally aligned with the two front wheels 120A, 120B. The frame 112 is shown in the drawings comprising a tubular structure with two generally parallel, longitudinally oriented base beams 122 connected at the front by a laterally oriented front axle 128 and at the back by a laterally oriented crossbeam 124 and a laterally oriented wheel bearing 126. Optional polymeric end plugs 130A and 130B can be inserted into the open ends of the base beams 122 and other open tube ends for aesthetic and/or safety purposes.

Like the configuration illustrated in FIG. 1, the front wheels 120A, 120B of FIGS. 5 and 6 are attached in a swivel-type mounting configuration to the front axle 128. For example, each of the front wheels 120A, 120B is rotatably connected, for example, via a wheel-pin or roller bearing, to a corresponding swivel fork 132A and 132B, respectively, such that the wheels 120A, 120B can revolve around respective central rolling axes (e.g., axis A1 of FIG. 1). Each swivel fork 132A, 132B, in turn, is rotatably connected via a corresponding swivel joint 134A and 134B, respectively, to the front axle 128. The swivel joints 134A, 134B allow the swivel forks 132A, 132B to rotate about respective vertically oriented non-rolling axes (e.g., axis A2 of FIG. 1) that are laterally offset from the center of the front axle 128 and pass through a diametric plane of the wheel 120A, 120B. Thus, the front wheels 120A, 120B, when in a swivel-type mounting configuration, can rotate around central rolling axes and swivel about vertical non-rolling axes. When in motion along a straight line, the swivel mounted wheels 120A, 120B will tend to automatically align with, and rotate parallel to the direction of travel.

By way of contrast, the rear wheel 118 is shown attached in a rigid-type mounting configuration to the rear of the frame 112. For example, the rear wheel 118 is rotatably mounted via the wheel bearing 126 to the longitudinally oriented base beams 122 such that the wheel 118 can revolve around a corresponding central rolling axis (e.g., axis A3 of FIG. 1). Unlike the front wheels 120A, 120B, however, the rear wheel 118 cannot swivel on the roller bearing 126 around a non-rolling axis. Optional configurations can include a swivel-mounted rear wheel or a hybrid rigid-swivel mount configuration.

The support platform 114 of FIGS. 5 and 6 is configured to support at least one human appendage. In the illustrated embodiment, for example, the support platform 114 is designed to prop up and hold the lower portion of a user's non-ambulatory leg during operation of the knee walker assembly 100. The support platform 114 of FIG. 1 includes a cushion 136 that is fixed (e.g., via screws) to the upper surface of a planar substrate 138. The cushion 136 may comprise, for example, a molded plastic body or a foam core that is covered with vinyl or any other suitable material. Optionally, the support platform 114 could be integrally formed with the substrate 138.

The support platform 114 can be vertically adjustable relative to the frame 112. Similar to the arrangement presented in FIG. 1, the support platform 114 of FIGS. 5 and 6 is mounted on top of a collapsible stanchion arrangement, designated generally at 140 in FIG. 5. The collapsible stanchion arrangement 140 includes a pair of pivoting stanchions 142 that are slidably and pivotably attached at respective first ends, e.g., via sliding hinge 141 slidably received in an elongated slot 139, to the substrate 138. The pivoting stanchions 142 are also pivotably attached at respective second ends thereof, e.g., via hinge mount 143, to the base beams 122 of the frame 112. The collapsible stanchion arrangement 140 also includes a pair of sliding stanchions 144 that are pivotably attached at respective first ends, e.g., via pivot hinge 145, to the substrate 138, and are slidably and pivotably attached at respective second ends to the frame 112 by a movable trolley 146. A hinge pin 149 rotatably connects the pivoting stanchions 142 to the sliding stanchions 144. The trolley 146 is slidably mounted to the base beams 122 for rectilinear travel between the front and rear ends of the frame 112. An optional M-shaped handle 147 projects outwardly and, in some embodiments, upwardly from the substrate 138 to provide users with a readily available gripping surface to more easily raise and lower the substrate 138 and, thus, the support platform 114.

With continuing reference to FIGS. 5 and 6, movement of the trolley 146 operates to adjust the vertical height of the support platform 114. In particular, sliding the trolley 146 forward on the frame 112 (e.g., to the left in FIG. 5) causes the pivoting stanchions 142 and sliding stanchions 144 to collapse in a scissor-like fashion towards the frame 112, thereby drawing the support platform 114 down towards the base beams 122. Antithetically, sliding the trolley 146 in the opposite direction towards the rear end of the frame 112 (e.g., to the right in FIG. 5) will draw the first and second ends of the pivoting stanchions 142 towards the first and second ends of the sliding stanchions 144, respectively, thereby raising the substrate 138 and, thus, the support platform 114.

Figure 7:
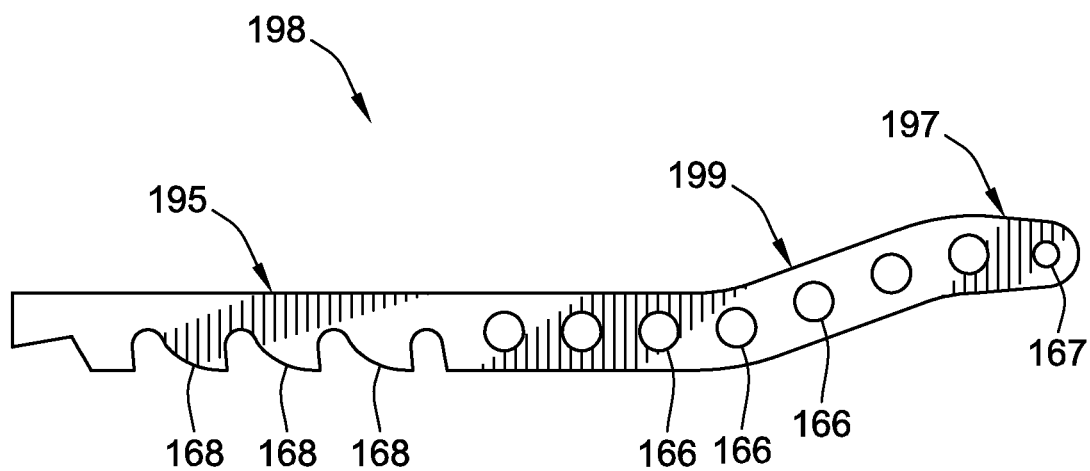
FIG. 7 is an enlarged side-view illustration of an exemplary locking bar mechanism that may be used with the knee walker assemblies of FIGS. 1 and 5.

The collapsible stanchion arrangement 140 of FIGS. 5 and 6 may include a locking tool for securing the support platform 114 at a desired vertical height. In accord with the illustrated example, a locking bar 198 is pivotably attached to an inside surface of at least one or, in the illustrated embodiment, both of the sliding stanchions 144. The locking bar 198, which is best seen in FIG. 7, includes an elongated, asymmetrical body with a serrated portion 195 that is connected to a handle portion 197 by a bent neck portion 199. An optional finger post 167 projects generally orthogonally from a proximal end of the handle portion 197 to provide an improved gripping area for operating the locking bar 198. A plurality of circular slots 166 extend through both the handle portion 197 and the neck portion 199. As shown, the locking bar 198 is pivotably attached to the collapsible stanchion arrangement 140 by passing the pivot pin 191 through the sliding stanchion(s) 144 and through one of the circular slots 201 in the handle portion 197 or neck portion 199. The serrated portion 195, on the other hand, includes a plurality of teeth 168 which are configured to receive therebetween and mate with an attachment pin 193 that extends between the inside surfaces of the pivoting stanchions 142. Optionally, the locking bar 198 can be pivotably attached to one or both of the pivoting stanchions 142.

FIG. 5 depicts the locking bar 198 coupling the pivoting stanchions 142 to the sliding stanchions 144 such that the support platform 114 is secured at a desired height. In particular, the locking bar 198 can be selectively rotated (e.g., in a clockwise direction in FIG. 5) to interleave the attachment pin 193 between two of the teeth 168. In so doing, the stanchions 142, 144 are restricted from rotating about the hinge pin 149 and, thus, the trolley is prevented from sliding back-and-forth across the frame 112. To change the height of the support platform 114, a user can pull up on the finger post 167 and/or handle portion 197 of the locking bar 198, which causes the serrated portion 195 to rotate away from the attachment pin 193 (e.g., in a counterclockwise direction in FIG. 5) and, in turn, causes the teeth 168 to disengage the attachment pin 193. After the support platform 114 is moved to a new desired height, the locking bar 198 can then be rotated to interleave the attachment pin 193 between two of the locking bar teeth 168.

The knee walker assembly 100, like the knee walker assembly 10, can also be provided with a steering mechanism 150 that is configured to selectively reposition the front wheels 120A, 120B such that a user can redirect the knee walker assembly 100. The steering mechanism 150 of FIGS. 5 and 6 comprises a steering column 152 that is operatively attached at a first end thereof to the frame 112 and at a second end thereof to the handle bar 116. A distal end of the steering column 152 is rotatably received in a vertically oriented hollow sleeve 158, which is coupled to the front end of the frame 112 via the front axle 128. A connector plate 172 projects from a lower portion of the steering column 152, just above the hollow sleeve 158, and pivotably attaches to a transversely oriented tie rod 170, e.g., via a nut-and-bolt connection 175. The connector plate 172 attaches the tie rod 170 to the steering column 152 such that the tie rod 170 shifts left and right when the steering column 152 is turned via manipulation of the handle bar 116. Each lateral end of the tie rod 170 operatively attaches to a respective one of the front wheels 120A, 120B, as described below. When so engaged, the tie rod 170 turns the front wheels 120A, 120B in response to the rotation of the handle bar 116 and, thus, the steering column 152.

The steering column 152 may be selectively repositionable between an upright, generally vertical position, as seen in FIG. 5, and a collapsed, generally horizontal position (e.g., similar to the collapsed position 52B shown in FIG. 2). In the illustrated embodiment, the steering mechanism 150 is provided with a locking hub 154 that is configured to retain the steering column 152 in the upright and collapsed positions and, in some embodiments, in any of a plurality of positions therebetween. In this instance, the steering column 152 is separated into two segments, with an upper segment 153 of the steering column 152 fixedly attached to a first toothed shoulder 157 of the locking hub 154, and a lower segment 155 of the steering column 152 fixedly attached to second toothed shoulder 159 of the locking hub 154. Rotation of a tension dial 156 in one direction (e.g., in a clockwise direction in FIG. 5) will loosen the locking hub 154 allowing for disengagement of the teeth of the first toothed shoulder 157 from the teeth of the second toothed shoulder 159. In so doing, the user can selectively reorient the upper segment 153 of the steering column 152 relative to the lower segment 155. Once oriented in the desired position, rotation of the tension dial 156 in an opposite direction (e.g., in a counterclockwise direction in FIG. 5) will meshingly engage the teeth of the first and second shoulders 157, 159 and mechanically lock the upper and lower segments 153, 155 of the steering column 152 in the selected orientation. Some optional features that may be suspended from or otherwise mounted to the steering column 152 include a basket 127 and a cup holder 129.

When the support platform 114 is moved to its lowest height, e.g., such that the pivoting stanchions 142 and sliding stanchions 144 are generally parallel to one another and the base beams 122, and the steering column 152 is moved to its lowest height, e.g., in a generally horizontal position laying across the cushion 136, the knee walker assembly 100 of FIGS. 5 and 6 provides a reduced packaging volume and footprint. In some non-limiting examples, the packaging volume of the collapsed knee walker assembly 100 is approximately $0.13 \text{ m}^3$ to $0.50 \text{ m}^3$, while in some embodiments the packaging volume is approximately $0.26 \text{ m}^3$. In some embodiments, the footprint of the knee walker assembly 100 is approximately $0.35 \text{ m}^2$ to $0.75 \text{ m}^2$, while in some embodiments the footprint is approximately $0.5 \text{ m}^2$.

The handle bar 116 may include a single handle, as indicated above, or may include multiple handles, such as right and left handle grips 162A and 162B, respectively, attached at opposing ends of the upper transverse section of a T-shaped handle mount 160. The handle bar 116 may be adjustable, for example, to accommodate users of differing heights and/or for increased compactness during storage of the knee walker assembly 100. In the illustrated embodiment, the handle mount 160 of FIGS. 5 and 6 is designed to telescope with respect to the steering column 152. In this instance, the downwardly extending section of the T-shaped handle mount 160 is slidably received through an opening in a hollow portion of the upper segment 153 of the steering column 152. A rotatable locking pin 164 can be selectively engaged and disengaged with longitudinally spaced holes in the handle mount 160 to allow a user to adjust the position of the handle bar 116 relative to the steering column 152. For instance, rotation of the locking pin 164 (e.g., in a clockwise direction in FIG. 5) will disengage the locking pin 164 from the holes in the handle mount 160 and release the handle bar 116, allowing for longitudinal translation thereof relative to the steering column 152. Once oriented in the desired position, rotation of the locking pin 164 in an opposite direction (e.g., counterclockwise in FIG. 5) will engage the locking pin 164 with one of the holes in the handle mount 160 and thereby mechanically retain the handle bar 116 in the selected orientation.

The knee walker assembly 100 may be provided with an optional braking mechanism 188 that is operable to slow and/or stop the knee walker assembly 100. In the illustrated embodiment, for example, the braking mechanism 188 includes right and left hand-actuated brake levers 190A and 190B, respectively, that are coupled to opposing ends of the upper transverse section of the handle mount 160. Bowden cables 194 operatively connect the brake levers 190A, 190B to a plunger brake 192 that is mounted to the frame 112 proximate the rear wheel 118. Actuation of either (or both) of the brake levers 190A, 190B transmits a mechanical pulling force through the cables 194 to the plunger brake 192, causing a pivotable shoe of the plunger brake 192 to press onto and frictionally engage the top of the rear wheel 118. As some optional variations, the braking mechanism 188 may utilize a single brake lever, may utilize multiple plunger brakes, may employ alternative mechanical means for activating the plunger brake 192, may automate the activation of the plunger brake 192, and may use a different type of brake assembly than the plunger brake 192 (e.g., rim brakes or disc brakes).

Both front wheels 120A, 120B of the knee walker assembly 100 are configured to selectively switch back-and-forth between a swivel-type mounting configuration and a rigid-type mounting configuration. The knee walker assembly 100 of FIGS. 5 and 6 may include a variable mounting assembly 174, which may be similar in design, function and operation to the mounting assembly 74 described above with respect to FIGS. 1-4. Like the mounting assembly 74, the variable mounting assembly 174 in the embodiments of FIGS. 5 and 6 is designed to simultaneously or nearly simultaneously transition both of the front wheels 120A, 120B from a swivel-type mounting configuration to a rigid-type mounting configuration and, when desired, back to the swivel-type mounting configuration. In some embodiments, the knee walker assembly 100 includes a locking mechanism that selectively engages the front wheels 120A, 120B to simultaneously or substantially simultaneously lock both of the front wheels 120A, 120B in a rigid-type mounting configuration. This provides the knee walker assembly 100 with all of the advantages of having swivel-mounted front wheels (e.g., increased maneuverability), while eliminating the disadvantages associated with a knee walker assembly with only swivel mounted front wheels (e.g., limited control).

Figure 8:
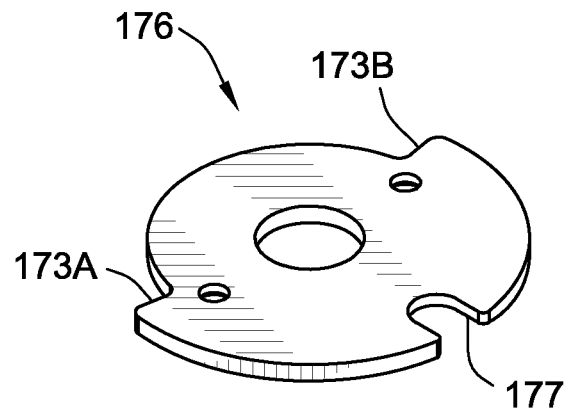
FIG. 8 is an enlarged perspective-view illustration of an exemplary locking disc that may be used with the knee walker assemblies of FIGS. 1 and 5.

Each of the front wheels 120A, 120B is swivel mounted to the frame 112 by a respective swivel fork 132A, 132B and swivel joint 134A, 134B. A locking disc 176, which is most readily visible in FIG. 8, is rigidly fastened to the top of each swivel fork 132A, 132B, for example, via a pair of threaded screws. Both locking discs 176 include a respective aperture 177 (readily visible in FIG. 6, but only labeled in FIG. 8) that is shaped and sized to receive a locking pin 186 (FIG. 6) to thereby lock the respective front wheel 120A, 120B in the rigid-type mounting configuration. Similar to the configuration of the knee walker 10 described above, the knee walker assembly 100 of FIGS. 5 and 6 includes a pair of retractable locking pin assemblies 180A and 180B for engaging and disengaging the locking pin 186 from the locking disc 176. In the illustrated embodiment, the retractable locking pin assemblies 180A, 180B can be structurally and functionally identical to the retractable locking pin assemblies 80 illustrated in FIGS. 3 and 4. Therefore, for brevity and conciseness, these components will not be described again in detail. In some alternative configurations, the retractable locking pin assemblies 180A, 180B can be individually or collectively varied in structure and/or function from the locking pin assemblies 80 of FIGS. 3 and 4.

Figure 9:
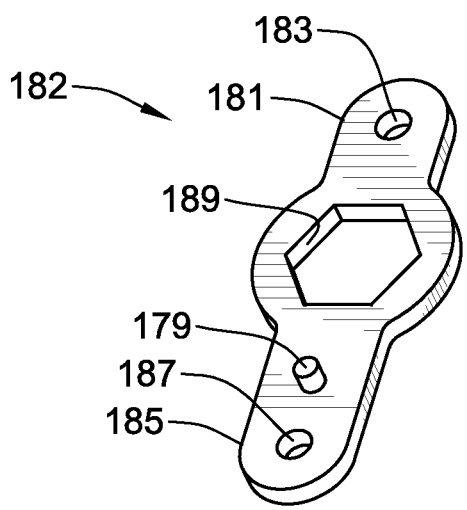
FIG. 9 is an enlarged perspective-view illustration of an exemplary steering plate that may be used with the knee walker assemblies of FIGS. 1 and 5.

According to the embodiment of FIGS. 5 and 6, each retractable locking pin assembly 180A, 180B is movably mounted to a respective one of the swivel joints 134A, 134B by a corresponding steering plate 182, which is more clearly seen in FIG. 9. In this arrangement, the locking pin assembly 180A, 180B is rigidly mounted, in a generally vertical orientation, to a first end 181 of the steering plate 182 on a rear side of the swivel joint 134A, 134B such that the locking pin 186 can pass through a first circular hole 183 in the steering plate 182 and into (or out of) the aperture 177 of the locking disc 176. A second circular hole 187 extends through a second end 185 of the steering plate 182, which is proximal a front side of the swivel joint 134A, 134B. The steering plate 182 is coupled to the transversely oriented tie rod 170, for example, via a threaded nut that is received through the second circular hole 187 and mated with a complementary bolt. A hexagonal hole 189 in between the first and second ends 181, 185 of the steering plate 182 receives therethrough a complementary bushing for rotatably attaching the steering plate 182 to one of the swivel joints 134A, 134B.

When the locking pin 186 is passed through the first circular hole 183 and into the aperture 177, the corresponding wheel 120A, 120B is locked in a rigid-type mounting configuration such that the wheel 120A, 120B can freely rotate around its respective central rolling axis, but the swivel fork 132A, 132B is restricted from freely rotating about the non-rolling axis. Nevertheless, when the locking pin 186 is seated in the aperture 177, the steering plate 182 is mechanically coupled to the locking disc 176 such that turning forces can be transmitted therebetween and the wheels 120A, 120B may be turned via the steering mechanism 150. When the locking pin 186 is retracted from the aperture 177, the corresponding wheel 120A, 120B is released into the swivel-type mounting configuration such that the wheel 120A, 120B can rotate around its respective central rolling axis, and the swivel fork 132A, 132B can rotate about the non-rolling axis. However, when the locking pin 186 is retracted, the steering plate 182 is no longer mechanically coupled via the locking pin 186 to the locking disc 176 such that turning forces can be transmitted therebetween. Thus, in at least some embodiments, when the front wheels 120A, 120B are in the swivel-type mounting configuration, the steering mechanism 150 is rendered inoperable. Moreover, the overall freedom of the wheels 120A, 120B to rotate about their rolling axes (whether in a rigid or swivel mount) can be regulated, for example, by the braking mechanism 188. Likewise, the overall freedom of the swivel forks 132A, 132B to swivel about their respective non-rolling axes when in swivel mount can be regulated, for example, by the locking discs 176, as will be developed in further detail below.

The knee walker assembly 100 includes an activating lever, represented herein by a thumb trigger 178, for selectively disengaging both of the locking pins 186 from and re-engaging the locking pins 186 with the locking discs 176. As shown, the thumb trigger 178 is attached to the handle bar 116 adjacent the right handle grip 162A. A retractor cable 188 is routed from the thumb trigger 178, through sheaths 190, and attached to a proximal end of the locking pins 186 (e.g., via cable connector 94 of FIG. 4). Activation of the thumb trigger 178, which may consist of pressing the thumb trigger 178 to rotate from a first "deactivated" position to a second "activated" position, will apply a tensile force to the retractor cable 188. The tensile force is passed through the retractor cable 188 to responsively draw both of the locking pins 186, e.g., upwardly, out of engagement with the locking discs 176, thereby releasing the front wheels 120A, 120B from a rigid mount. Both wheels 120A, 120B are substantially simultaneously switched to a swivel-type mounting configuration and can therefore rotate around respective central rolling axes, and both swivel forks 132A, 132B can freely rotate around respective non-rolling axes.

For an optional safety feature, the thumb trigger 178 may be spring-biased towards the first "deactivated" position such that the retractor cable 188 does not apply a tensile force to the locking pins 186, and the locking pins 186 remain engaged with their respective locking discs 176. In so doing, the knee walker 100 defaults to a rigid-type mounting configuration such that wheels 120A, 120B can rotate around respective central rolling axes, but the swivel fork 132A, 132B, although still steerable via the steering mechanism 150, are restricted from freely rotating around respective non-rolling axes.

When the front wheels 120A, 120B are released into a swivel mount by the retractable locking pin assemblies 180, the rotational freedom of the swivel forks 132A, 132B can be limited to pivoting within a predetermined range of rotation. By way of non-limiting example, a post 179 projects generally orthogonally (e.g., downward in FIGS. 5 and 6) from the second end 185 of the steering plate 182. First and second shoulders 173A and 173B are circumferentially spaced about the perimeter of the locking disc 176. As the swivel mounted locking discs 176, which are rigidly mounted for common rotation with their respective swivel forks 132A, 132B, rotate about the non-rolling axis, the rotational freedom of the swivel forks 132A, 132B is limited by the post 179 engaging the shoulders 173A and 173B and thereby restricting further rotation of the locking discs 176. In some embodiments, when the front wheels 120A, 120B are released by the retractable locking pin assemblies 180, the swivel forks 132A, 132B are restricted to pivoting less than 360 degrees about the non-rolling axes. In other embodiments, the swivel forks 132A, 132B are restricted to pivoting less than approximately 160 degrees about the non-rolling axes—e.g., 80 degrees left and 80 degrees right from center. It is certainly within the scope and spirit of the present disclosure to restrict the rotational freedom of the swivel forks 132A, 132B to other predetermined ranges of rotation. Alternatively, the swivel forks 132A, 132B can be allowed to freely rotate without any restriction when in swivel mount.

The knee walker assembly 100 may also be provided with some optional safety features. By way of non-limiting example, the knee walker assembly 100 can include one or more safety reflectors to make the knee walker 100 more visible to others, especially during dusk, dawn, and nighttime use. The safety reflector may be in the nature of a retroreflector device or a self-illuminating apparatus or any other suitable device. As another option, or alternative, the knee walker assembly 100 may include light-reflective paint.

Exemplary Embodiments

The following exemplary embodiments of the invention are not intended to represent every embodiment, or every aspect, of the present invention. Rather, some of the above-disclosed features and advantages, and other features and advantages of the present invention, will become more readily apparent from the following examples.

According to one embodiment of the present disclosure, a knee walker assembly is disclosed that includes a frame with a support platform and a handle mounted to the frame. At least one rear wheel is mounted to the frame proximate the rear end thereof, and at least two front wheels are each swivel mounted to the frame proximate the front end thereof. A locking mechanism is operatively engaged with the at least two front wheels. The locking mechanism is configured to lock both of the front wheels in a rigid-type mounting configuration.

In accordance with one optional facet, the locking mechanism includes at least two retractable locking pin assemblies, each of which is mounted to the frame and configured to selectively engage a respective one of the front wheels to thereby lock the respective front wheel in the rigid-type mounting configuration.

Optionally, the locking mechanism may further comprise at least two locking discs, each of which is mounted for rotation with a respective one of the at least two front wheels and is configured to mate with a respective one of the retractable locking pin assemblies to thereby lock the respective front wheel in the rigid-type mounting configuration.

Optionally, each of the retractable locking pin assemblies may include a housing, a pin slidably mounted at least partially within the housing, a biasing member urging the pin out of the housing, and a retractor cable configured to draw the pin into the housing In accordance with another optional facet, the knee walker assembly may include at least two swivel forks, each of which mounts a respective one of the front wheels to the frame. The swivel forks are each configured to rotate about a respective non-rolling axis, and the at least two front wheels are each configured to rotate about a respective rolling axis.

Optionally, the swivel forks are restricted from freely rotating about the non-rolling axes when the front wheels are locked by the locking mechanism.

Optionally, the two front wheels, when released by the locking mechanism, are operable to pivot less than 360 degrees about the non-rolling axis.

Optionally, the locking mechanism may include a single activating lever configured to selectively disengage the locking mechanism from both of the front wheels.

Another embodiment of the present disclosure is directed to a knee walker assembly for aiding a physically impaired person in walking. This knee walker assembly includes a rigid frame with a support platform mounted to the frame. The support platform is configured to support at least one human appendage. At least one rear wheel is mounted proximate the rear end of the frame. The knee walker assembly also includes at least two front wheels. A variable mounting assembly mounts the at least two front wheels proximate the front end of the frame. The variable mounting assembly is configured to simultaneously transition both of the at least two front wheels between a swivel-type mounting configuration and a rigid-type mounting configuration.

Yet another embodiment of the present disclosure is directed to a method of manufacturing a knee walker assembly. The method includes: mounting a support platform to a rigid frame, the support platform being configured to support at least one human appendage; mounting a handle to the frame; mounting at least one rear wheel proximate a rear end of the frame; mounting at least two front wheels proximate a front end of the frame such that the front wheels can transition between a swivel-type mounting configuration and rigid-type mounting configuration; and, attaching a locking mechanism to the frame, the locking mechanism including a single activating lever that is attached to the handle and is configured to substantially simultaneously lock both of the at least two front wheels in the rigid-type mounting configuration.

In accordance with yet another embodiment, a knee walker assembly is provided. The knee walker assembly includes a frame with a handle mounted to the frame. At least one rear wheel is mounted to the frame proximate the rear end thereof, and at least one front wheel is mounted to the frame proximate the front end thereof. The knee walker assembly also includes a support platform that is configured to support at least a portion of an appendage. A collapsible stanchion arrangement movably mounts the support platform to the frame. The collapsible stanchion arrangement includes a trolley and a first stanchion attached at a first end thereof to the support platform and attached at a second end thereof to the trolley. The trolley is slidably mounted to the frame such that movement of the trolley relative to the frame operates to adjust a vertical height of the support platform.

In accordance with one optional facet, the first end of the first stanchion is pivotably attached to the support platform and the second end of the first stanchion is pivotably attached to the trolley.

In accordance with another optional facet, the collapsible stanchion arrangement further comprises a second stanchion pivotably attached at a first end thereof to the support platform and pivotably attached at a second end thereof to the frame.

Optionally, the first stanchion is rotatably attached to the second stanchion such that the first and second stanchions move in a scissor-like motion when the trolley is slid along the frame to adjust the vertical height of the support platform.

Optionally, the first end of the second stanchion is pivotably attached to the support platform via a sliding hinge.

According to another optional facet, the knee walker assembly may include a locking bar that is configured to selectively lock the first stanchion to the second stanchion such that the support platform is secured at a desired height.

Optionally, the locking bar may include a serrated portion connected to a handle portion by a neck portion. The neck portion is configured to pivotably attach the locking bar to one of the first and the second stanchions. The serrated portion is configured to mate with an attachment pin projecting from the other of the first and the second stanchions to thereby lock the first stanchion to the second stanchion.

According to yet another optional facet, the knee walker assembly may include a steering mechanism mounted to the frame and operatively attached to the at least one front wheel. The steering mechanism is operable to selectively reposition the at least one front wheel.

Optionally, the steering mechanism may include a steering column that is attached at a first end thereof to the frame and at a second end thereof to the handle. The steering column is selectively repositionable between an upright position and a collapsed position.

Optionally, the knee walker assembly has a packaging volume of approximately 0.13 m³ to 0.50 m³ when the support platform is at its lowest vertical height and the steering column is at its lowest collapsed position.

In accordance with yet another optional facet, the at least one front wheel includes first and second front wheels, and the knee walker assembly further comprises first and second swivel forks each swivel mounting a respective one of the front wheels to the frame. Each swivel forks is configured to rotate about a respective non-rolling axis, while the front wheels are each configured to rotate about a respective rolling axis.

Optionally, the knee walker assembly may include a locking mechanism configured to lock both of the front wheels in a rigid-type mounting configuration such that the swivel forks are restricted from freely rotating about the non-rolling axes.

Optionally, the locking mechanism employs a single activating lever to selectively disengage the locking mechanism from both of the front wheels.

Optionally, when the front wheels are not locked in the rigid-type mounting configuration, the first and second swivel forks are restricted to pivoting less than 360 degrees about the non-rolling axes.

Optionally, when the front wheels are not locked in the rigid-type mounting configuration, the first and second swivel forks are restricted to pivoting less than approximately 160 degrees about the non-rolling axes.

Another embodiment of the present disclosure is directed to a knee walker assembly for aiding a physically impaired person in walking. This knee walker assembly includes a rigid frame with at least one rear wheel mounted proximate the rear end of the frame, and at least two front wheels mounted proximate the front end of the frame. The knee walker assembly also includes a support platform configured to support at least a portion of a human leg. A collapsible stanchion arrangement movably mounts the support platform to the frame. The collapsible stanchion arrangement includes a trolley that is slidably mounted to the frame, a first stanchion pivotably attached at a first end thereof to the support platform and pivotably attached at a second end thereof to the trolley, and a second stanchion pivotably attached at a first end thereof to the support platform and pivotably attached at a second end thereof to the frame. The trolley is configured to selectively slide back-and-forth along the frame to thereby adjust a vertical height of the support platform.

Another embodiment of the present disclosure is directed to a method of manufacturing a knee walker assembly. This method includes: attaching a handle to a rigid frame; attaching at least one rear wheel proximate a rear end of the frame; attaching at least two front wheels proximate a front end of the frame; attaching a steering mechanism to the frame, the steering mechanism being operable to selectively reposition the at least two front wheels; attaching a support platform to a collapsible stanchion arrangement, the support platform being configured to support at least a portion of a human appendage; attaching the collapsible stanchion arrangement to the frame, the collapsible stanchion arrangement movably mounting the support platform to the frame, the collapsible stanchion arrangement including a trolley and a first stanchion attached at a first end thereof to the support platform and attached at a second end thereof to the trolley, the trolley being slidably mounted to the frame such that movement of the trolley relative to the frame operates to adjust a vertical height of the support platform.

While many representative embodiments and modes for carrying out the present invention have been described in detail, those familiar with the art to which this invention relates will recognize various alternative designs and embodiments for practicing the invention within the scope of the appended claims.

What is claimed is:

1. A knee walker assembly comprising:
   a frame with opposing front and rear ends;
   a handle mounted to the frame;
   at least one rear wheel mounted to the frame proximate the rear end thereof;
   at least one front wheel mounted to the frame proximate the front end thereof;
   a support platform configured to support at least a portion of an appendage; and
   a collapsible stanchion arrangement movably mounting the support platform to the frame, the collapsible stanchion arrangement including a trolley, a first stanchion attached at a first end thereof to the support platform and attached at a second end thereof to the trolley, and a second stanchion attached at a first end thereof, via a sliding hinge, to the support platform and attached at a second end thereof to the frame, the trolley being slidably mounted to the frame such that movement of the trolley relative to the frame operates to adjust a vertical height of the support platform.

2. The knee walker assembly of claim 1, wherein the first end of the first stanchion is pivotably attached to the support platform and the second end of the first stanchion is pivotably attached to the trolley.

3. The knee walker assembly of claim 1, wherein the second stanchion is pivotably attached at the first end thereof to the support platform and pivotably attached at the second end thereof to the frame.

4. The knee walker assembly of claim 1, wherein the first stanchion is rotatably attached to the second stanchion such that the first and second stanchions move in a scissor-like motion when the trolley is slid along the frame to adjust the vertical height of the support platform.

5. The knee walker assembly of claim 1, wherein the sliding hinge comprises a hinge pin slidably received in an elongated slot of the support platform.

6. The knee walker assembly of claim 1, further comprising a locking bar configured to selectively lock the first stanchion to the second stanchion such that the support platform is secured at a desired height.

7. The knee walker assembly of claim 6, wherein the locking bar includes a serrated portion connected to a handle portion by a neck portion, the neck portion being configured to pivotably attach the locking bar to one of the first and the second stanchions, and the serrated portion being configured to mate with an attachment pin projecting from the other of the first and the second stanchions to thereby lock the first stanchion to the second stanchion.

8. The A knee walker assembly comprising:
   a frame with opposing front and rear ends;
   a handle mounted to the frame;
   at least one rear wheel mounted to the frame proximate the rear end thereof;
   at least one front wheel mounted to the frame proximate the front end thereof;
   a steering mechanism mounted to the frame and operatively attached to the at least one front wheel, the steering mechanism being operable to selectively reposition the at least one front wheel;
   a support platform configured to support at least a portion of an appendage; and
   a collapsible stanchion arrangement movably mounting the support platform to the frame, the collapsible stanchion arrangement including a trolley and a first stanchion attached at a first end thereof to the support platform and attached at a second end thereof to the trolley, the trolley being slidably mounted to the frame such that movement of the trolley relative to the frame operates to adjust a vertical height of the support platform.

9. The knee walker assembly of claim 8, wherein the steering mechanism comprises a steering column attached at a first end to the frame and at a second end to the handle, the steering column being selectively repositionable between an upright position and a collapsed position.

10. The knee walker assembly of claim 9, wherein the support platform has a lowest vertical height and the steering column has a lowest collapsed position, the knee walker assembly having a packaging volume of approximately 0.13 $m^3$ to 0.50 $m^3$ when the support platform is at the lowest vertical height and the steering column is at the lowest collapsed position.

11. The knee walker assembly of claim 1, wherein the at least one front wheel includes first and second front wheels, the knee walker assembly further comprising first and second swivel forks each swivel mounting a respective one of the front wheels to the frame, the swivel forks each being configured to rotate about a respective non-rolling axis, and the front wheels each being configured to rotate about a respective rolling axis.

12. The knee walker assembly of claim 11, further comprising a locking mechanism configured to lock both of the front wheels in a rigid-type mounting configuration such that the swivel forks are restricted from freely rotating about the non-rolling axes.

13. The knee walker assembly of claim 12, wherein the locking mechanism comprises a single activating lever configured to selectively disengage the locking mechanism from both of the first and second front wheels.

14. The knee walker assembly of claim 11, wherein, when the front wheels are not locked in the rigid-type mounting configuration, the first and second swivel forks are restricted to pivoting less than 360 degrees about the non-rolling axes.

15. The knee walker assembly of claim 11, wherein, when the front wheels are not locked in the rigid-type mounting configuration, the first and second swivel forks are restricted to pivoting less than approximately 160 degrees about the non-rolling axes.

16. A knee walker assembly for aiding a physically impaired person in walking, the knee walker assembly comprising:
a rigid frame with opposing front and rear ends;
at least one rear wheel mounted proximate the rear end of the frame;
at least two front wheels mounted proximate the front end of the frame;
a support platform configured to support at least a portion of a human leg; and
a collapsible stanchion arrangement movably mounting the support platform to the frame, the collapsible stanchion arrangement including:
a trolley slidably mounted to the frame;
a first stanchion pivotably attached at a first end thereof to the support platform and pivotably attached at a second end thereof to the trolley; and
a second stanchion pivotably attached, via a sliding hinge, at a first end thereof to the support platform and pivotably attached at a second end thereof to the frame;
wherein the trolley is configured to selectively slide back-and-forth along the frame to thereby adjust a vertical height of the support platform.

17. The knee walker assembly of claim 16, wherein the first stanchion is rotatably attached to the second stanchion such that the first and second stanchions move in a scissor-like motion when the trolley is slid along the frame to adjust the vertical height of the support platform.

18. The knee walker assembly of claim 16, further comprising a locking bar configured to selectively lock the first stanchion to the second stanchion such that the support platform is secured at a desired height.

19. The knee walker assembly of claim 16, wherein the sliding hinge comprises a hinge pin slidably received in an elongated slot of the support platform.

20. A method of manufacturing a knee walker assembly, the method comprising:
attaching a handle to a rigid frame;
attaching at least one rear wheel proximate a rear end of the frame;
attaching at least one front wheel proximate a front end of the frame;
attaching a support platform to a collapsible stanchion arrangement, the support platform being configured to support at least a portion of a human appendage;
attaching the collapsible stanchion arrangement to the frame, the collapsible stanchion arrangement movably mounting the support platform to the frame, the collapsible stanchion arrangement including a trolley, a first stanchion attached at a first end thereof to the support platform and attached at a second end thereof to the trolley, and a second stanchion attached at a first end thereof, via a sliding hinge, to the support platform and attached at a second end thereof to the frame, the trolley being slidably mounted to the frame such that movement of the trolley relative to the frame operates to adjust a vertical height of the support platform.

* * * * *

UNITED STATES PATENT AND TRADEMARK OFFICE
CERTIFICATE OF CORRECTION

PATENT NO. : 8,827,284 B2
APPLICATION NO. : 13/535700
DATED : September 9, 2014
INVENTOR(S) : Linda M. Walther et al.

It is certified that error appears in the above-identified patent and that said Letters Patent is hereby corrected as shown below:

In the Claims
In Column 18, Line 53 (Claim 8, line 1), please delete "the".

Signed and Sealed this
Twenty-fourth Day of February, 2015

Michelle K. Lee
*Deputy Director of the United States Patent and Trademark Office*